(12) United States Patent
Gnesda et al.

(10) Patent No.: US 9,460,283 B2
(45) Date of Patent: Oct. 4, 2016

(54) ADAPTIVE INTEGRITY VALIDATION FOR PORTABLE INFORMATION HANDLING SYSTEMS

(71) Applicant: Dell Products L.P., Round Rock, TX (US)

(72) Inventors: Nicholas Gnesda, Aurora, IL (US); Abhay Salunke, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 374 days.

(21) Appl. No.: 13/647,872

(22) Filed: Oct. 9, 2012

(65) Prior Publication Data

US 2014/0101757 A1    Apr. 10, 2014

(51) Int. Cl.
  *G06F 21/00*    (2013.01)
  *G06F 21/56*    (2013.01)

(52) U.S. Cl.
  CPC ...... *G06F 21/562* (2013.01); *G06F 2221/2111* (2013.01)

(58) Field of Classification Search
  None
  See application file for complete search history.

(56) References Cited

U.S. PATENT DOCUMENTS

| | | | |
|---|---|---|---|
| 7,539,986 B2 | 5/2009 | Grobman | |
| 7,584,508 B1* | 9/2009 | Kashchenko | H04L 63/105 726/25 |
| 7,607,174 B1* | 10/2009 | Kashchenko et al. | 726/25 |
| 7,725,941 B1 | 5/2010 | Pavlyushchik | |
| 7,779,472 B1 | 8/2010 | Lou | |
| 8,214,905 B1* | 7/2012 | Doukhvalov et al. | 726/24 |
| 8,225,404 B2* | 7/2012 | Freericks | G06F 21/57 713/164 |
| 8,370,939 B2* | 2/2013 | Zaitsev et al. | 726/23 |
| 8,370,946 B2* | 2/2013 | Kashchenko | G06F 21/577 726/25 |
| 8,595,803 B2* | 11/2013 | Zaitsev | G06F 21/56 726/4 |
| 8,707,437 B1* | 4/2014 | Ming-Chang | G06F 21/554 726/22 |
| 2003/0084322 A1* | 5/2003 | Schertz | G06F 21/55 726/23 |
| 2004/0025042 A1* | 2/2004 | Kouznetsov et al. | 713/200 |
| 2004/0210653 A1* | 10/2004 | Kanoor et al. | 709/223 |
| 2005/0138433 A1* | 6/2005 | Linetsky | G06F 21/31 726/19 |
| 2006/0150238 A1* | 7/2006 | D'Agostino | H04L 63/102 726/1 |
| 2007/0143851 A1* | 6/2007 | Nicodemus et al. | 726/25 |
| 2007/0168285 A1* | 7/2007 | Girtakovskis et al. | 705/50 |
| 2008/0127114 A1 | 5/2008 | Vasudevan | |
| 2008/0244691 A1* | 10/2008 | Hilerio | H04L 63/102 726/1 |

(Continued)

OTHER PUBLICATIONS

Cooper et al., Bios Protection Guidelines, NIST National Institution of Standard and Technology, Special Publication 800-147, Apr. 2011, 26 pgs.

*Primary Examiner* — Andrew Nalven
*Assistant Examiner* — Christopher Ruprecht
(74) *Attorney, Agent, or Firm* — Terrile, Cannatti, Chambers & Holland, LLP; Robert W. Holland (57) ABSTRACT

Portable information handling systems dynamically allocate resources to anti-malware functions based upon available resources and threat status. Dynamic allocation of resources to anti-malware functions provides a timely and targeted response to specific threats with resources dedicated based upon availability and the impact on other information handling system functions. An adaptive mobile integrity validation system interfaces with plural portable information handling systems to selectively update anti-malware settings as threats emerge.

18 Claims, 4 Drawing Sheets

(56) References Cited

U.S. PATENT DOCUMENTS

| | | | |
|---|---|---|---|
| 2008/0301796 A1* | 12/2008 | Holostov et al. | 726/12 |
| 2009/0044272 A1* | 2/2009 | Jarrett | G06F 21/568 726/23 |
| 2009/0100520 A1 | 4/2009 | Reasor et al. | |
| 2009/0125755 A1* | 5/2009 | Herscovitz | G06F 21/567 714/15 |
| 2009/0307696 A1* | 12/2009 | Vals et al. | 718/102 |
| 2010/0043066 A1* | 2/2010 | Miliefsky | H04L 63/0263 726/9 |
| 2010/0077481 A1* | 3/2010 | Polyakov | G06F 21/568 726/24 |
| 2010/0138926 A1* | 6/2010 | Kashchenko | G06F 21/74 726/25 |
| 2010/0211963 A1* | 8/2010 | Suwabe | G06F 13/385 719/327 |
| 2010/0251365 A1* | 9/2010 | Lyne | G06F 21/55 726/22 |
| 2011/0161452 A1* | 6/2011 | Poornachandran | G06F 21/554 709/207 |
| 2011/0289308 A1* | 11/2011 | Sobko | G06F 21/56 713/100 |
| 2012/0054857 A1* | 3/2012 | Bisso et al. | 726/22 |
| 2012/0102568 A1* | 4/2012 | Tarbotton | G06F 21/552 726/23 |
| 2013/0145437 A1* | 6/2013 | Zaitsev | G06F 21/56 726/4 |
| 2013/0212671 A1* | 8/2013 | Wang | G06F 21/70 726/16 |
| 2013/0304676 A1* | 11/2013 | Gupta et al. | 706/12 |

* cited by examiner

ADAPTIVE INTEGRITY VALIDATION FOR PORTABLE INFORMATION HANDLING SYSTEMS

BACKGROUND OF THE INVENTION

1. Field of the Invention

The present invention relates in general to the field of information handling system security, and more particularly to adaptive integrity validation for portable information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically built from a variety of components that cooperate to process information. As the capabilities of information handling system components have improved over time, information handling system manufacturers have packed an increasing amount of processing capability in ever smaller housings. For example, information handling systems have transitioned from stationary desktop configurations to portable laptop configurations. A typical laptop information handling system operates in much the same manner as a desktop information handling system but also includes an integrated display, keyboard, battery and wireless network interface so that the laptop information handling system functions free of any wired connections. Many end users have come to appreciate the convenience of laptop information handling systems and have adopted laptop systems as replacements for desktop systems. More recently, laptop information handling systems have transitioned into tablet and smartphone configurations that provide even greater portability than clamshell-type laptop configurations since the tablet and smartphone configurations typically do not include a physical keyboard. Instead, tablet and smartphone information handling systems generally include a touchscreen that presents a keyboard through which an end user can input information.

Tablet and smartphone information handling systems provide increased portability and are typically used most often to consume information rather than create information. For instance, tablet information handling systems have a relatively small form factor that allows an end user to rapidly power up the system and access information through publicly-available wireless networks. Through the course of a day, an end user might access information through multiple Wi-Fi (WLAN) and wireless wide area networks (WWAN). A tablet information handling system provides a convenient tool for web browsing, document review and e-mail reading; however, if an end user needs to write a document or reply to an e-mail, touchscreen keyboards of tablet information handling systems can prove awkward. Often, end users will use a more conventional laptop information handling system with an integrated keyboard when document creation tasks arise. Alternatively, an end user may interface a peripheral keyboard with a tablet information handling system to input information for document creation. Even when a tablet information handling system uses a keyboard peripheral, tablet information handling systems typically have more limited processing and memory resources than laptop or desktop systems that provide a slower user experience for complex document creation tasks.

One difficulty with using all types of information handling systems is the danger presented by viruses and malware that cause damage to and sometimes steal information stored on an information handling system. Conventional information handling systems typically include virus and malware detection capabilities that scan information stored on an information handling system and remove malicious software when detected. Typical virus and malware protection software runs in the background at an information handling system to scan for known malware, virus, trojan horse and other types of malicious code. For example, anti-virus software performs threat updates and threat scans at scheduled times, such as system boot or initialization of resources in a static manner. Generally, conventional information handling systems experience minimal impacts from the operation of virus and malware protection software. In contrast, tablet information handling systems lack the processing resources and internal power storage to support processing for active malware scanning in the same manner as more powerful laptop and desktop information handling systems. Continuous scanning for malware and viruses can impact the usability of a tablet system by slowing other tasks and reducing battery life.

SUMMARY OF THE INVENTION

Therefore a need has arisen for a system and method which provides flexible and adaptive processing tools to balance tablet information handling system integrity validation capabilities based upon real-time operating conditions, such as threats, power status, and usage profiles.

In accordance with the present invention, a system and method are provided which substantially reduce the disadvantages and problems associated with previous methods and systems for protecting an information handling system from security threats. Resources at an information handling system are analyzed against threat status to dynamically adjust anti-malware settings. Dynamic response to change resource use and threats provides improved anti-malware response with more efficient use of system resources so that the impact of an anti-malware response on a user experience at an information handling system is reduced.

More specifically, an adaptive mobile integrity validation system interfaces with plural information handling systems to dynamically adapt anti-malware settings of the plural information handling systems based upon threats and available resources for responding to the threats. Information handling systems receive messages from the adaptive mobile integrity validation system, such as resource interrogation/modification request (RI/MR) scripts that direct execution of instructions regarding resource use and threat status. An integrity validation module operating on the information handling system applies the resource use and threat status to adjust settings of an anti-malware application running on the information handling system. For example, the integrity validation module adjusts anti-malware application settings based upon resource use, such as battery or power status, memory status, storage capacity and processor activity; based upon physical location, such as a GPS location out of a country, enterprise location or employee home; based upon communications, such as a network interface with an unsecured versus secured WLAN, a network interface in a WWAN, a roaming network interface, a trusted network interface, and a network interfaced based from a predetermined country; and based upon a threat status. The integrity validation module can report on operating system and firmware specifics, such as with systems and processes that use knowledge of operating system specific vulnerabilities to modify behavior like an increase in checks for older and unpatched operating systems. Each information handling system interfaced with an adaptive integrity validation system applies a RI/MR script to modify anti-malware settings so that component resources of the information handling system have a balanced use relative to a defined threat, such as by allocating resources to scan for one or more threats in a more aggressive manner while conserving resources for reduced end user impact by less aggressive scanning related to threats of lower significance while aggressive scanning takes place for other threats.

The present invention provides a number of important technical advantages. One example of an important technical advantage is that an adaptive mobile integrity validation system and framework supports the checking of portable information handling system devices for security breaches in a manner that trades off resource impacts based upon the severity of a perceived threat. Integrity validation is adjusted for the type of information handling system and its usage model. For example, reduced processing workloads for malware scanning are applied at a tablet or smartphone information handling system in order to prevent undue impacts on battery life and system response. Adjustments to integrity validation operations are made based upon a determined threat state in order to ensure adequate resources are applied to system security with minimal impact on system operations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Portable information handling systems, such as tablets and smartphones, dynamically adjust anti-malware settings to respond to changing threats and changing resource use. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
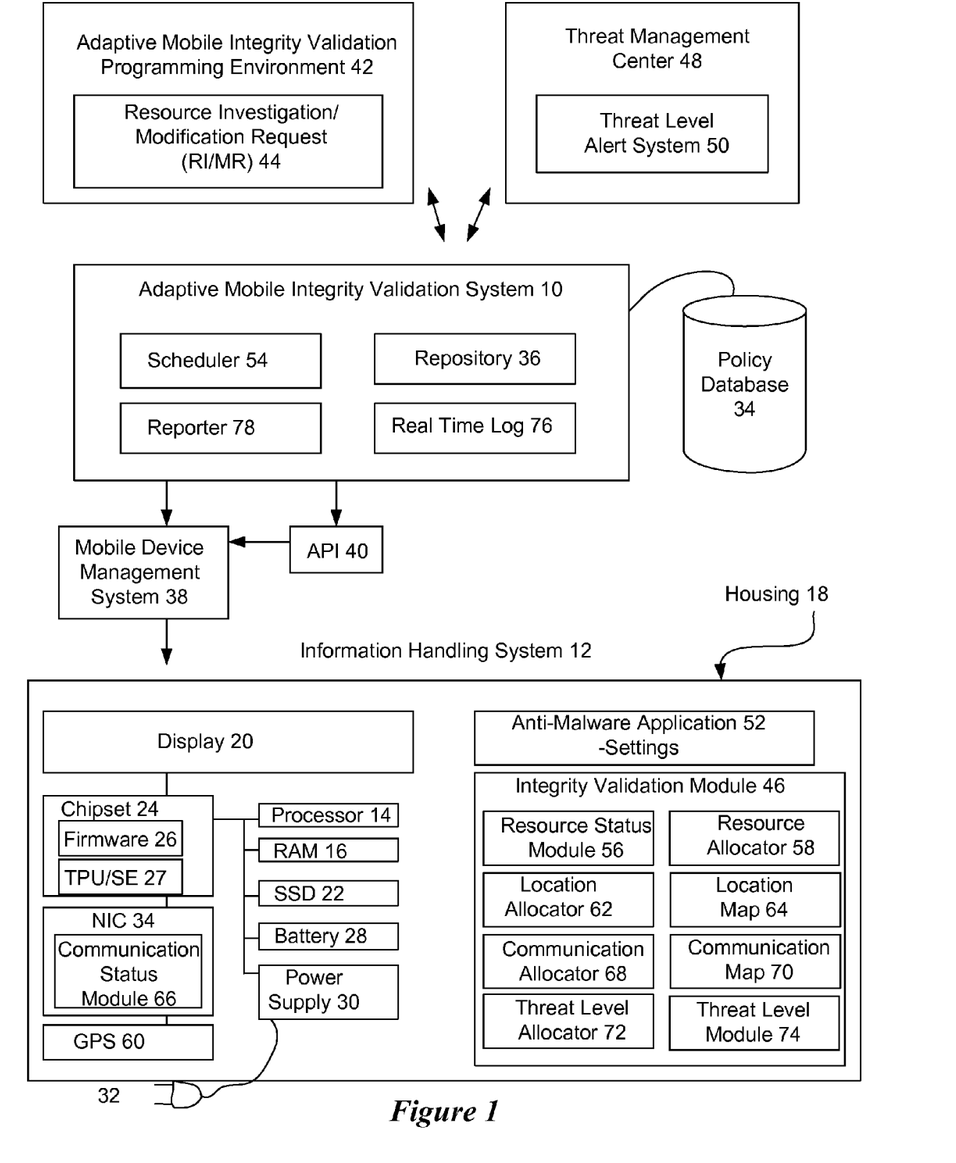
FIG. 1 depicts a block diagram of an adaptive mobile integrity validation system for managing integrity validation of portable information handling systems.

Referring now to FIG. 1, a block diagram depicts an adaptive mobile integrity validation system 10 for managing integrity validation of portable information handling systems 12. In the example embodiment depicted by FIG. 1, portable information handling system 12 is a tablet information handling system having a processor 14 to process information and random access memory (RAM) 16 interfaced with processor 14 to store information is support of processor operations. Processor 14 and RAM 16 are disposed in a portable housing 18, such as a single piece housing having a touchscreen display 20 disposed over processor 14 and RAM 16. Housing 18 also supports other components interfaced with processor 14 that perform storage, processing and communication tasks. For example, non-volatile storage is provided by a solid state device 22. A chipset 24 includes firmware 26, such as a BIOS that coordinates interactions between processor 14 and other components. For example, firmware 26 boots processor 14 to an operational state by retrieving an operating system from solid state drive 22. As another example, firmware 26 includes instructions that execute on an embedded controller to manage power provided by a battery 28 and power supply 30 interfaced with external power 32. In the example embodiment, the chipset includes a Trusted Processing Unit/Secure Element (TPU/SE) architecture 27 that provides enhanced system security, such as by restricting access to secure elements so that malware has greater difficulty penetrating to secure elements. A network interface card (NIC) 34 provides network communications, such as through wireless local area networks (WLANs) and wireless wide area networks (WWANs). In one alternative embodiment, portable information handling system 12 is a tablet having a smartphone configuration, such as a WWAN interface to the POTS and the Internet. In alternative embodiments, portable information handling system 12 has a clamshell configuration with an integrated keyboard. In one alternative embodiment, adaptive mobile integrity validation system 10 also manages information handling systems have a non-portable configuration, such as desktop systems.

Adaptive mobile integrity validation system 10 interacts with portable information handling systems 12 to manage protective measures at plural information handling systems 12, such as to maintain the integrity of the information handling systems 12 from malicious attacks. Adaptive mobile integrity validation system 10 is, for example, an application executing on a server information handling system that maintains a policy database 34 of acceptable mobile device integrity validation policies and a repository 36 of resource data having a normal or safe mode for mobile devices or a mobile device community. For example, repository 36 includes acceptable operating system releases, images, files, applications, media hash values, system parameters, firmware and DNS parameters for a community defined by device type (e.g., tablet, smartphone, model number, platform, etc. . . . ) and or device enterprise user (e.g., business employees, mobile service provider, etc. . . . ). Adaptive mobile integrity validation system 10 communicates with portable client information handling systems 12 through secure communication protocols, such a public or private key encrypted communication through an Internet interface. In one embodiment, adaptive mobile integrity validation system 10 is a stand-alone system that provides integrity validation services; alternatively, adaptive mobile integrity validation system 12 operates as an integrated portion of a mobile device management (MDM) system 38 having defined interfaces with portable information handling systems 12. When operating as a stand-alone system, adaptive mobile integrity validation system 10 defines an application programming interface (API) 40 to interface with mobile device management systems 38. API 40 supports removal and installation of applications, modification of firmware and port parameters, retrieval of device parameters, and other such functions at portable information handling systems 12.

Adaptive mobile integrity validation system 10 interfaces with a programming environment 42, which provides a platform for generation of integrity validation information downloads for use by portable information handling systems 12. For example, programming environment 42 outputs a resource investigation modification request (RI/MR) 44 that is provided to portable information handling systems 12 through adaptive mobile integrity validation system 10. RI/MR scripts 44 are created, installed and executed in cooperation with programming environment 42 to achieve integrity validation goals, such as a response that identifies and neutralizes malware on portable information handling systems 12. RI/MR scripts 44 are pushed down to portable information handling systems 12 that are clients of an adaptive mobile integrity validation system 10 and are executed. For example portable information handling systems 12 include an integrity validation module 46 running as an agent on processor 14 that interfaces as a client of adaptive mobile integrity validation system 10 to retrieve and execute RI/MR scripts 44.

Adaptive mobile integrity validation system 10 interfaces with a threat management center 48 that monitors malware threats and issues threat level alerts by a threat level alert system 50. In one embodiment, threat level alerts are issued with the format of a RI/MR script 44 that may be selectively passed on to portable information handling systems 12. Threat level alert system 50 provides threat levels that indicate a level of vigilance at portable information handling systems 12 for threats of a particular type. For example, a newly detected virus that spreads by e-mail attachments can result in an adjustment to threat monitoring at portable information handling systems 12 so that additional system resources are allocated to monitoring for that threat, such as by increasing e-mail attachment monitoring while leaving other monitoring unchanged. As another example, a threat level alert system 50 issues a threat level RI/MR script that identifies a fast-spreading worm. Adaptive mobile integrity validation system 10 forwards the RI/MR script to portable information handling systems 12 along with adjustments to integrity validation monitoring parameters to increase monitoring for signs of the worm while maintaining constant resource usage by decreasing integrity validation monitoring of other malware threats.

Adaptive mobile integrity validation system 10 interacts with client portable information handling systems 12 through an integrity validation module 46 running on a processor 14 or other processing resource, such as a trusted processing resource in chipset 24. In one embodiment, integrity validation module 46 is a module within an anti-malware application 52 stored in memory of portable information handling system 12. In an alternative embodiment, integrity validation module 46 is separate from anti-malware application 52 and distributed across plural components of portable information handling system 12. Integrity validation module 46 includes instructions that receive RI/MR scripts 44 and perform functions defined by the scripts, such as executing instructions to analyze identified resources like the ports open at the system, resource or file hash generation, and component status. Integrity validation module 46 performs script functions with schedule invocations of a scheduler 54 or with a trigger invocation associated with an event, such as receipt of an e-mail or establishment of a network interface. In alternative embodiments, multiple targeted resource and algorithm combinations can be invoked. Integrity validation module 46 provides immediate, scheduled and/or triggered updates as set by programming environment 42. Integrity validation functions at a portable information handling system 12 may be performed with multiple RI/MR scripts 44 to target systems 12 at a lowest common denominator so that processing resources of a system 12 are not unnecessarily wasted by non-relevant RI/MR scripts. For example, RI/MR scripts 44 are sent only to portable information handling systems that are vulnerable to a threat so that resources of non-threatened portable information handling systems are not wasted addressing non-relevant threats.

Integrity validation module 46 performs analysis on portable information handling systems 10 to include components individually, sequenced, triggered by status changes, and algorithmically combined. The analysis targets anti-malware settings of anti-malware application 52 against relevant threats on a per-system basis so that system resources are not unnecessarily burdened with non-relevant threat responses. For example, component status of a portable information handling system 12 is analyzed by a resource status module 56, such as logic running on an embedded controller, to adjust anti-malware settings with a resource allocator 58. In example embodiments, component status includes battery charge, the availability of external power, memory capacity, memory utilization, storage, and processor activity. For instance, the frequency of malware scans are adjusted based upon the processing and power resources available for the scans. In another embodiment, a location status module, such as GPS receiver 60, provides location information so that a location allocator 62 can adjust anti-malware settings based upon location. For instance, anti-malware scan frequency or scan type is adjusted if portable information handling system 12 is located in a different country, at an enterprise location or at a home location. As an example, location map 64 provides threat status for locations that location allocator 62 applies to determine anti-malware settings. In another embodiment, a communication status module 66, such as logic running in a NIC 34 or chipset 24, analyzes network communications interfaced with portable information handling system 12 so that a communication allocator 68 adjusts anti-malware settings based upon the analyzed network communications. For instance, a Wi-Fi network detected by a WNIC, a roaming network provided by a WWAN interface or an enterprise/home network interface are compared against a map 70 to establish anti-malware settings. In another embodiment, a threat level allocator 72 and threat level module 74 interface with threat management center 48 to adjust anti-malware settings according to identified threats. For instance, a RI/MR script 44 identifies potentially infected or modified applications, vulnerable ports, vulnerable DNS and vulnerable firmware, potentially infected system or kernel files and untrustworthy configuration settings. Threat level module 74 determines relevant threats from the RI/MR script 44 and provides the relevant threats to threat allocator 72. Threat allocator 72 adjusts anti-malware settings to focus resources of portable information handling system 12 on system-specific threats for less resource-intrusive malware monitoring. Adaptive mobile integrity validation system 10 tracks communications with portable information handling systems 12 in a real time log 76, including reports of malware detections. A reporter 78 provides threat management center 48 with reports of malware detections and responses.

Figure 2:
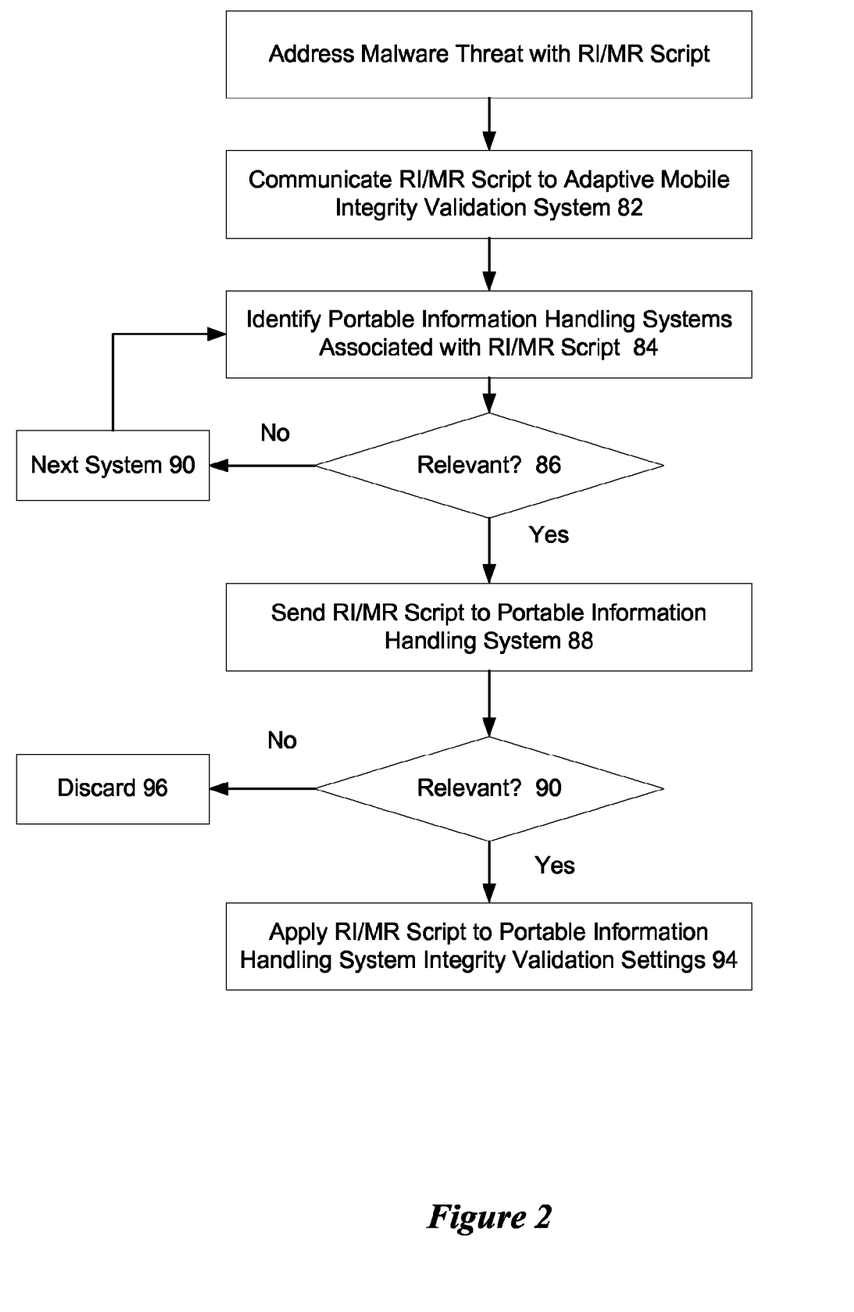
FIG. 2 depicts a flow diagram of a process for allocating information handling system resources to threat response.

Referring now to FIG. 2, a flow diagram depicts a process for allocating information handling system resources to threat response. The process begins at step 80 with creation of a RI/MR script to address a malware threat. The RI/MR script defines the threat and resource allocation rules for managing the threat at predetermined information handling systems. At step 82, the RI/MR script is sent to the adaptive mobile integrity system for distribution to information handling systems. At step 84, the adaptive mobile integrity validation system identifies information handling systems associated with the RI/MR script. For example, RI/MR scripts can issue based upon a variety of needs, such as the enterprise that owns the information handling system, the model of information handling system, specific components on information handling systems like a BIOS or operating system, the type of platform used to support the components, etc. . . . . At step 86, a determination is made of whether a RI/MR script is relevant for an information handling system under the management of the adaptive mobile integrity validation system. For instance, a RI/MR script issued by an enterprise for a threat to a WINDOWs operating system may not be relevant to enterprise systems that run an ANDROID operating system. If the RI/MR script is not relevant, the process goes to step 90 to the next system or RI/MR script. If a RI/MR script is relevant for one or more information handling systems, the process continues to step 88 to download the RI/MR script to information handling systems to which it is relevant.

Once a RI/MR script is loaded to a portable information handling system, the process continues to step 90 to determine at the information handling system whether the RI/MR script is relevant. If not, the update is discarded at step 96. If the update is relevant at step 90, the process continues to step 94 to apply the RI/MR script to adjust the portable information handling system integrity validation settings. As an example, the RI/MR script provides two new threats to the information handling system, one a Trojan horse that downloads if an infected file is executed from a web browser, the other a worm that has rapidly spread with e-mail communications. The information handling system applies information extracted from the RI/MR script to adjust settings of an anti-malware application for the two new threats. Since the Trojan horse presents only at infected websites, it presents less of a threat and is included in normal malware detection scans. Since the worm presents a rapidly spreading threat, settings the anti-malware application are adjusted to focus processing resources on detecting and stopping the worm threat. If the threat level remains constant, resources assigned at the information handling system for running the anti-malware application remain constant but a greater amount of resources are focused on detection of worms in e-mail. For example, the frequency of non-email anti-malware functions is reduced to allow an increase in e-mail anti-malware functions. If the worm had an increased threat level associated with it, then additional resources of the information handling system would be made available for anti-malware functions at the risk of an impact to the end user experience. In alternative embodiments, alternative dynamic trade-offs may apply between how resources are assigned to anti-malware functions and how many resources are assigned to anti-malware functions as threats are identified to an information handling system.

Figure 3:
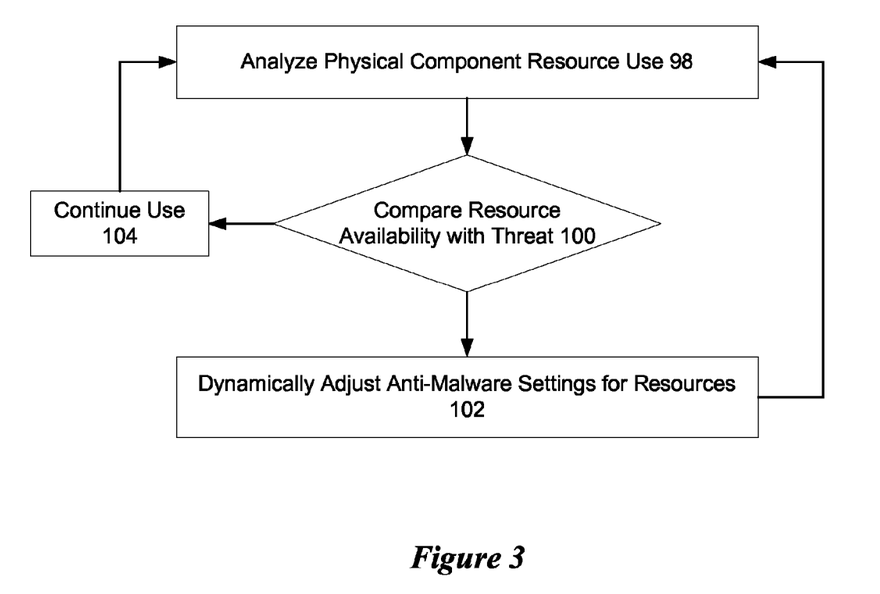
FIG. 3 depicts a flow diagram of a process for adjusting anti-malware settings in response to physical component use.

Referring now to FIG. 3, a flow diagram depicts a process for adjusting anti-malware settings in response to physical component use. The process starts at step 98 with analysis of physical component resources of an information handling system. The analysis includes broad system information, such as the model or platform type and specific component types and also includes the status of components at a particular time period, such as the battery charge, power draw, memory utilization, storage utilization, processing activity and screen activity. At step 100, the resource availability determined from the analysis is compared with the threat status. If the available resources and threat are aligned, the process continues to step 104 to continue use of current anti-malware settings and to step 98 to repeat the analysis on a periodic or other basis. If the available resources and threat status are not aligned, the process continues to step 102 to dynamically adjust anti-malware settings for resource use and then to step 98 to repeat analysis on a periodic or other basis.

At step 100, comparison of resource availability with a threat level can involve a number of different approaches in various embodiments. One resource to consider is the charge status of an internal battery, the availability of external power and the power drawn by end user activity. If power availability is low relative to end user activity, then anti-malware settings are selectively reduced for a given threat level. For instance, if an end user is approaching the end of battery life, anti-malware settings suspend anti-malware activity to limit power draw, such as by disabling automatically initiated anti-malware scans. On the other hand, if an end user has left the system fully charged on an external power source without end user activity, then at the same threat level a full system scan is accomplished. Similar adjustments are made to anti-malware settings for memory and processor utilizations so that end user activity at the information handling system is not interfered with by anti-malware functions. If the threat level changes, anti-malware settings adjust for a given resource availability so that resource use remains balanced relative to the threat. For instance, an increased threat increases the number of anti-malware scans, the frequency of anti-malware scans, and/or the memory and processor resources dedicated to anti-malware functions. In one embodiment, an increased threat level results in increased anti-malware activity directed towards a specific threat while other anti-malware settings remain the same. For instance, a specific type of scan is increased, such as with more frequent e-mail scans. As one example, when a tablet system interfaces to a keyboard, detection of the keyboard adjusts anti-malware scans to focus more component resources on end-user document creation applications. Other types of adjustments to anti-malware settings may be used, such as those described with position and communication analysis.

Figure 4:
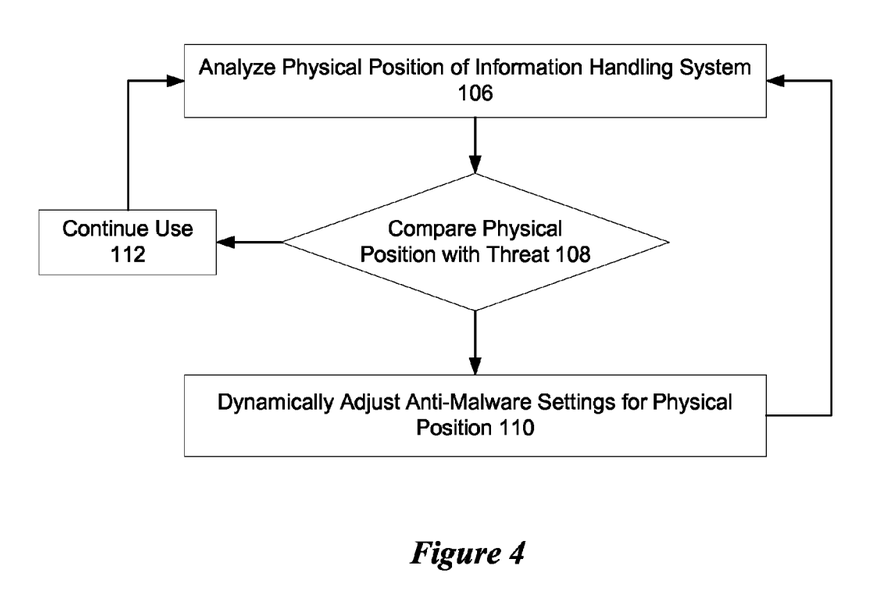
FIG. 4 depicts a flow diagram of a process for adjusting anti-malware settings in response to a physical location.

Referring now to FIG. 4, a flow diagram depicts a process for adjusting anti-malware settings in response to a physical location. The process starts at step 106 with analysis of the physical position of the information handling system, such as provided by a GPS receiver. At step 108, the physical position is compared with the threat to determine whether anti-malware settings are aligned with the threat for the detected position. If the anti-malware settings are aligned for the threat and position, the process continues to step 112 to continue use of the current anti-malware settings and to step 106 for continued analysis on a periodic or other basis. If the anti-malware settings are not aligned with the position and threat, the process continues to step 110 to dynamically adjust the anti-malware settings. In one example embodiment, the comparison with physical position compares the detected position with defined safe and unsafe positions, such as those stored in a memory map of the information handling system. If the information handling system is in a safe zone, such as within an enterprise site or end user home, anti-malware settings may be relaxed to provide greater resource availability for other applications. If the information handling system is in an unsafe zone, such as outside of the country of the end user or within a competitor's or supplier's office, anti-malware settings may be increased to provide increased security. As an example, in a safe position, certain types of files may be executed without restriction, such as e-mail attachments, while those same files may be prohibited from execution in an unsafe zone. As another example, in a safe zone network ports may retrieve information without restriction, while in an unsafe zone, only a network port associated with a virtual private network may be allowed to retrieve information. Other types of adjustments to anti-malware settings may be used, such as those described with resource and communication analysis.

Figure 5:
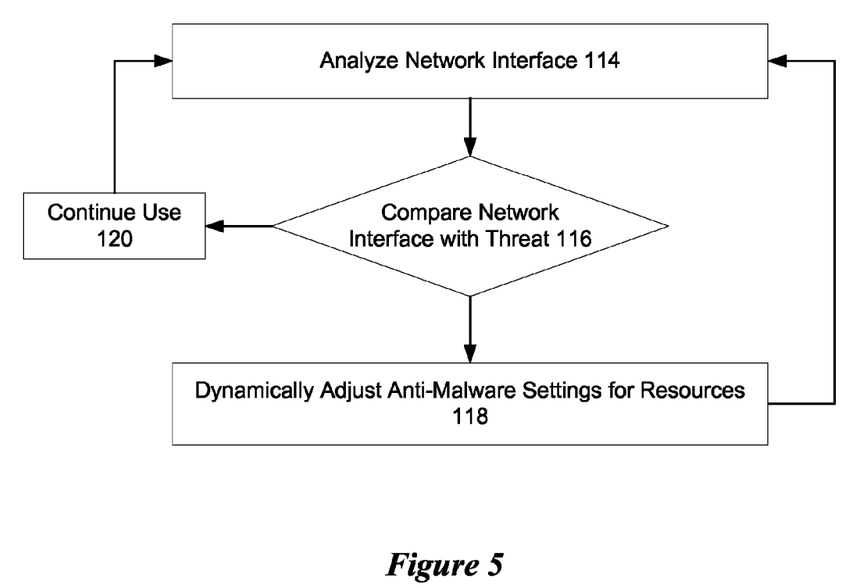
FIG. 5 depicts a flow diagram of process for adjusting anti-malware settings in response to a network interface.

Referring now to FIG. 5, a flow diagram depicts a process for adjusting anti-malware settings in response to a network interface. The process starts at step 114 with analysis of the network interface of the information handling system, such as a WLAN, WWAN or other type of network interface. For instance, a WLAN is analyzed as less safe if unsecured and more safe if secured. As another example, a WWAN is analyzed as less safe if through a roaming connection and more safe if through an known wireless carrier. Other examples include varying degrees of safety associated with known corporate interfaces or encrypted interfaces. At step 124, the network interface is compared with the threat status to determine if anti-malware settings are aligned with the threat. If so, the process continues to step 120 to continue using the current anti-malware settings and to step 114 to analyze network interfaces on a periodic or other basis. If the network interface analysis and threat status are not aligned with current malware settings, the process continues to step 118 to dynamically adjust the anti-malware settings. For example, the type of scan used to detect malware is adjusted based upon the type of network setting, such as prohibiting execution of downloaded files while in an unsafe network area while allowing execution of certain downloaded files without an anti-malware scan when in a safe network. As another example a first rate of anti-malware scan frequency is applied in a first network area and a second rate of anti-malware scan frequency is applied in a second network area. Other types of adjustments to anti-malware settings may be used, such as those described with resource and position analysis.

Figure 6:
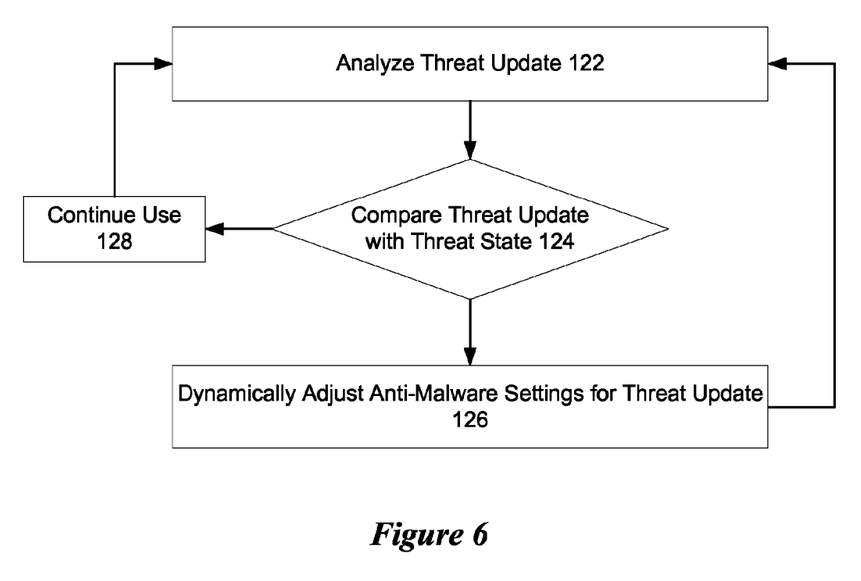
FIG. 6 depicts a flow diagram of a process for adjusting anti-malware settings in response to a threat update.

Referring now to FIG. 6, a flow diagram depicts a process for adjusting anti-malware settings in response to a threat update. The process begins at step 122 with analysis of a threat update at step 122, such as a new threat or change in threat level provided from an adaptive mobile integrity validation system. At step 124 a comparison is made of the threat update with the threat state to determine if anti-malware settings are aligned with the threat update. If so, the process continues to step 128 to continue use of the anti-malware settings and to step 122 to analyze threat updates on a periodic or other basis. If the anti-malware settings are not aligned with the threat state based on the threat update, the process continues to step 126 to dynamically adjust the anti-malware settings for the threat update. In one embodiment, threat levels are provided with threat updates, such as a low, medium and high threat level, each having associated resource allocations for anti-malware settings. Threat levels can result in dynamic adjustments to anti-malware settings that have an immediate effect or that are triggered by predetermined activities, such as downloading or executing predetermined files. As an example, increasing threat levels result in increased threat protection by an anti-malware application at the expense of power consumption until the threat level subsides.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to process information;
memory disposed in the housing and interfaced with the processor to store the information;
a network interface disposed in the housing and interfaced with the processor, the network interface operable to communicate with a network; and
an integrity validation module executing on the processor and operable to dynamically change anti-malware settings based upon one or more predetermined factors detected at an information handling system, the anti-malware settings including at least the frequency of anti-malware scans, the integrity validation module receiving a notification from an external network location regarding a first threat and, in response to the notification, increasing anti-malware settings associated with the threat and decreasing anti-malware settings associated with at least a different second threat, the increasing and decreasing anti-malware settings causing an increase in processing resources spent protecting against the first threat and a decrease in processing resources spent protecting against the second threat;
wherein the first threat comprises a threat associated with applications associated with keyed inputs made at the information handling system, the integrity validation module detecting whether a peripheral keyboard is connected at the housing or disconnected from the housing, the integrity validation module increasing anti-malware settings for the first threat if the peripheral keyboard is physically connected at the housing and decreasing the anti-malware settings for the first threat if the peripheral keyboard is physically disconnected at the housing.

2. The information handling system of claim 1 wherein the integrity validation module further comprises:
a resource status module operable to gather the status of one more resources of the information handling system; and
a resource allocator interfaced with the resource status module and operable to dynamically change anti-malware settings based upon the status of the one or more resources.

3. The information handling system of claim 2 wherein the one or more resources comprises a power source having plural factors and the anti-malware settings comprise initiation of automated malware scans, the resource allocator dynamically disabling and enabling the automated malware scans for predetermined power source factors.

4. The information handling system of claim 3 wherein the power source factors comprise operation of the information handling system on the battery with the battery below a predetermined charge, the resource allocator dynamically disabling automated malware scans below the predetermined charge.

5. The information handling system of claim 1 wherein the integrity validation module further comprises:
a location module operable to gather the location of the information handling system; and
a location allocator interfaced with the location module and operable to dynamically change anti-malware settings based upon the location of the information handling system.

6. The information handling system of claim 5 wherein the location module comprises a GPS receiver and the anti-malware settings comprise restrictions on execution of predetermined applications at the information handling system.

7. The information handling system of claim 6 wherein the location allocator further comprises a map having one or more safe locations and the restrictions further comprise prohibition of execution of applications retrieved through the network interface except for one or more predetermined ports.

8. The information handling system of claim 1 wherein the integrity validation module further comprises:
a communication module operable to determine a network interfaced with the information handling system; and
a communication allocator interfaced with the communication module and operable to dynamically change anti-malware settings based upon the determined network interfaces of the information handling system.

9. The information handling system of claim 8 wherein the communication allocator further comprises a map having one or more safe networks and the anti-malware settings comprise restrictions on downloads made through the network interface.

10. A method for integrity validation at an information handling system, the method comprising:
analyzing one or more predetermined factors at an information handling system; and
dynamically changing anti-malware settings of the information handling system in response to the analyzing;
wherein the predetermined factors comprises detection of whether a keyboard is physically connected to the information handling system or physically disconnected from the information handling system, and wherein dynamically changing anti-malware settings further comprises increasing information handling resources for anti-malware operations associated with end user document preparation applications and decreasing information handling system resources for anti-malware settings of at least one other type of malware threat if the keyboard is physically connected to the information handling system relative to the resources if the keyboard is physically disconnected from the information handling system.

11. The method of claim 10 wherein:
analyzing one or more predetermined factors further comprises analyzing physical resources of the information handling system; and
dynamically changing anti-malware settings further comprises adjusting usage of the physical resources by one or more anti-malware tools based upon analyzing of the physical resources.

12. The method of claim 11 wherein the anti-malware settings comprise the frequency of anti-malware scans performed at the information handling system.

13. The method of claim 10 wherein:
analyzing one or more predetermined factors comprises determining the physical position of the information handling system; and
dynamically changing anti-malware settings further comprises adjusting the anti-malware settings to restrict execution of predetermined applications at the information handling system.

14. The method of claim 13 wherein predetermined applications comprise applications retrieved through a network.

15. The method of claim 10 wherein:
analyzing one or more predetermined factors comprises determining a network interfaced with the information handling system; and
dynamically changing anti-malware settings further comprises applying a first malware scan frequency for a first network and a second malware scan frequency for a second network.

16. The method of claim 10 wherein:
analyzing one or more predetermined factors comprises determining a network interfaced with the information handling system; and
dynamically changing anti-malware settings further comprises applying a first malware scan type associated with a first set of file types for a first network and a second malware scan type associated with a second set of file types for a second network.

17. The method of claim 10 further comprising:
retrieving a threat status from a network location through a network interface; and
applying the threat status to adjust a malware scan frequency.

18. The method of claim 10 further comprising:
retrieving a threat status from a network location through a network interface; and
applying the threat status to adjust a malware scan type.

* * * * *